Patented Sept. 3, 1940

2,213,763

UNITED STATES PATENT OFFICE 2,213,763

POLYVINYL ACETAL RESIN COMPOSITION CONTAINING ACYL AMIDES

Jack J. Gordon, Kingsport, Tenn., assignor to Eastman Kodak Company, Rochester, N. Y., a corporation of New Jersey No Drawing. Application October 14, 1939, Serial No. 299,573

4 Claims. (Cl. 260—36)

This invention relates to plastic compositions, and more particularly to compositions comprising a polyvinyl acetal resin and a conditioning agent.

One object of this invention is to produce compositions of matter which may be made into permanently transparent, strong and flexible sheets or films of desired thinness which are substantially water-proof, are unaffected by ordinary photographic fluids, and possess the desired properties of a support for sensitive photographic coatings. Another object is to produce compositions which can be rolled, extruded, molded or otherwise worked into relatively thick sheets and massive plastics. A further object is to produce compositions suitable for use in lacquers, artificial silk filaments, wrapping tissues and the like. Other objects will hereinafter appear.

I have discovered that an acyl amide selected from the group consisting of acetoacetamide, N,N-di-n-butyl acetamide, N-n-butyl diacetamide, and N-n-butyl dipropionamide is a useful plasticizer for polyvinyl acetal resins, increasing the flexibility and toughness of polyvinyl acetal resin films, sheets or other objects or masses containing it.

For the manufacture of cast films or sheets, the polyvinyl acetal resin and the plasticizer may be dissolved in a suitable solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. From about 5 to 100 parts of the acyl amide per 100 parts of resin may be employed, depending upon the nature of the resin and the purpose for which the sheets are to be used. Suitable proportions of the plasticizer for any resin and any purpose may be readily determined by experiment. For the manufacture of sheets suitable for photographic film base, 5 to 25 parts of acyl amide per 100 parts of resin are suitable. The resin solution is cast as a sheet, the solvent evaporated, and the sheet stripped from the casting surface.

I give below, methods of preparing my novel plasticizers.

EXAMPLE I.—*Acetoacetamide.*—1160 grams of methyl acetoacetate was weighed into a 3-liter beaker and 780 grams of a 28% aqueous solution of ammonia was poured into it. The solution was shaken for a few minutes, then cooled in a bath of melting ice for several hours. The precipitate was filtered off, washed twice with ice-cold ethyl alcohol, dissolved in hot ethyl alcohol, cooled, and filtered off again. The product,

had a melting point of 81° C., and a specific gravity of 0.968 at 114° C.

EXAMPLE II.—*N,N-di-n-butyl acetamide.*—2600 grams of 97% acetic anhydride was placed in a 3-necked, 12-liter flask equipped with a stirrer, a reflux condenser, and a dropping funnel. 1,790 grams of di-n-butyl amine was added dropwise with vigorous agitation. After all the amine had been added, the material was refluxed for 4 hours. Then, most of the acetic acid formed and the excess anhydride was distilled off at atmospheric pressure. The remainder was removed by distilling under reduced pressure. The product, CH₃.CO.N(C₄H₉)₂, was distilled under vacuum.

EXAMPLE III.—*N-n-butyl diacetamide.*—7000 grams of 97% acetic anhydride was placed in a 3-necked, 12-liter flask equipped with a stirrer, reflux condenser, and dropping funnel. 2,200 grams of 95% n-butyl amine was added dropwise, with vigorous agitation. After all the n-butyl amine had been added, the material was heated for 6 hours at 122° C. Then, as much acetic acid and acetic anhydride as possible was distilled off at atmospheric pressure; the remainder was distilled off at reduced pressure. The formula of the product is (CH₃.CO)₂.N.(CH₂)₃.CH₃.

EXAMPLE IV.—*N-n-butyl dipropionamide.*—1625 grams of propionic anhydride was weighed into the 3-liter reaction flask of a set-up such as that described in Example III, and stirred vigorously while 435 grams of n-butyl amine was added dropwise through the condenser After all the butylamine had been added, the propionic acid formed in the reaction, and the excess propionic anhydride were distilled off at atmospheric pressure. The product, (CH₃.CH₂.CO)₂.N.(CH₂)₃.CH₃, distilled at 167° C. at 103 mm. Hg pressure. It had a melting point of —32° C.

The polyvinyl acetal resins can be prepared by reacting polyvinyl alcohol with an aldehyde in the presence of an acetal condensation catalyst, e. g., a mineral acid. These resins can also be prepared by simultaneously de-esterifying a polyvinyl aliphatic ester and reacting the de-esterification product with an aldehyde in the presence of a de-esterifying catalyst and acetal condensation catalyst. Mineral acids are catalysts for both de-esterification and acetal formation. Among the polyvinyl acetal resins with which these acyl amides are useful may be mentioned, as illustrative examples, the polyvinyl formaldehyde acetal resins, the polyvinyl acetaldehyde acetal resins, the polyvinyl formaldehyde acetaldehyde mixed acetal resins, the polyvinyl butyraldehyde acetal resins and the polyvinyl butyraldehyde acetaldehyde mixed acetal resins.

Examples of the preparation of polyvinyl formaldehyde acetal resins may be found in U. S. Patent 1,955,068, Examples 1, 4 and 5; in U. S. Patent 2,036,092, Examples 1, 2, 3, 7 and 8; in British Patent 454,691, Examples 1, 2, 3, 4, 5, 6 and 7; in British Patent 404,279, Example 3; and in British Patent 436,072, Examples 1, 2, 3, 4, 5, 6 and 7.

Examples of the preparation of polyvinyl acetaldehyde acetal resins may be found in U. S. Patent 2,044,730, Example 1; U. S. Patent 1,955,068, Example 2; U. S. Patent 2,036,092, Examples 4, 5 and 6; British Patent 466,598, Examples 1, 2, 3, 4 and 7; British Patent 404,279, Examples 1, 2, 4, 5, 6, 7 and 8; U. S. Patent 1,990,399; and French Patent 808,578, Examples 1, 2 and 3.

Examples of the preparation of polyvinyl formaldehyde acetaldehyde mixed acetal resins may be found in British Patent 430,136, Examples 1, 2, 3, 4, 5 and 6; British Patent 445,565, Example 2; British Patent 465,873, Examples 1, 2, 3, 4, 5 and 6; French Patent 808,586, Examples 1, 2, 3, 4, 5, 6, 12, 13, 14, 15, 16, 17, 18 and 19.

Examples of the preparation of polyvinyl butyraldehyde acetal resins may be found in U. S. Patent 2,044,730, Examples 2, 5 and 6; British Patent 466,598, Examples 5; French Patent 813,303, Example 1; French Patent 813,514, Examples 1, 2, 3 and 4; and British Patent 459,878, Examples 1, 2, 5, 6, 7, 8, 9 and 10.

An example of the preparation of a polyvinyl butyraldehyde acetaldehyde mixed acetal resin is given in French Patent 813, 303, Example 2.

What I claim as my invention and desire to be secured by Letters Patent of the United States is:

1. A composition of matter comprising a polyvinyl acetal resin and, as a plasticizer therefor, an acyl amide selected from the group consisting of acetoacetamide, N,N-di-n-butyl acetamide, N-n-butyl diacetamide, and N-n-butyl dipropionamide.

2. A composition of matter comprising a polyvinyl formaldehyde acetal resin and, as a plasticizer therefor, an acyl amide selected from the group consisting of acetoacetamide, N,N-di-n-butyl acetamide, N-n-butyl diacetamide, and N-n-butyl dipropionamide.

3. A composition of matter comprising a polyvinyl acetaldehyde acetal resin and, as a platicizer therefor, an acyl amide selected from the group consisting of acetoacetamide, N,N-di-n-butyl acetamide, N-n-butyl diacetamide, and N-n-butyl dipropionamide.

4. A composition of matter comprising a polyvinyl butyraldehyde acetal resin and, as a plasticizer therefor, an acyl amide selected from the group consisting of acetoacetamide, N,N-di-n-butyl acetamide, N-n-butyl diacetamide, and N-n-butyl dipropionamide.

JACK J. GORDON.